United States Patent
Halstvedt et al.

(10) Patent No.: US 10,311,875 B2
(45) Date of Patent: Jun. 4, 2019

(54) FULL-DUPLEX UTTERANCE PROCESSING IN A NATURAL LANGUAGE VIRTUAL ASSISTANT

(71) Applicant: SoundHound, Inc., Santa Clara, CA (US)

(72) Inventors: Scott Halstvedt, Santa Clara, CA (US); Bernard Mont-Reynaud, Sunnyvale, CA (US); Kazi Asif Wadud, Toronto (CA)

(73) Assignee: SOUNDHOUND, INC., Santa Clara, CA (US)

( * ) Notice: Subject to any disclaimer, the term of this patent is extended or adjusted under 35 U.S.C. 154(b) by 0 days.

(21) Appl. No.: 15/389,122

(22) Filed: Dec. 22, 2016

(65) Prior Publication Data

US 2018/0182398 A1    Jun. 28, 2018

(51) Int. Cl.
*G10L 15/30* (2013.01)
*G10L 15/22* (2006.01)
*G06F 17/27* (2006.01)

(52) U.S. Cl.
CPC ............ *G10L 15/30* (2013.01); *G06F 17/279* (2013.01); *G10L 15/22* (2013.01); *G10L 15/222* (2013.01); *G10L 2015/223* (2013.01)

(58) Field of Classification Search
USPC ....................................................... 704/7–10
See application file for complete search history.

(56) References Cited

U.S. PATENT DOCUMENTS

| | | | |
|---|---|---|---|
| 5,652,789 A | 7/1997 | Miner et al. | |
| 7,319,992 B2 | 1/2008 | Gaos | |
| 8,112,280 B2 | 2/2012 | Lu | |
| 8,279,779 B2 | 10/2012 | Singh et al. | |
| 8,805,683 B1* | 8/2014 | Wiseman | G10L 15/22 379/88.01 |
| 9,111,537 B1* | 8/2015 | Wiseman | G10L 15/22 |
| 9,208,225 B1* | 12/2015 | Sharifi | G06F 17/30743 |
| 9,280,599 B1* | 3/2016 | Wiseman | G06F 17/30758 |
| 9,384,734 B1* | 7/2016 | Wiseman | G10L 15/26 |
| 2007/0274297 A1 | 11/2007 | Cross et al. | |

(Continued)

OTHER PUBLICATIONS

Michaela Atterer, et al., Towards Incremental End-of-Utterance Detection in Dialogue Systems, Coling 2008: Companion volume—Posters and Demonstrations, Aug. 2008, pp. 11-14, Manchester.

(Continued)

*Primary Examiner* — Leonard Saint Cyr
(74) *Attorney, Agent, or Firm* — Fenwick & West LLP

(57) ABSTRACT

A query-processing system processes an input audio stream that represents a succession of queries spoken by a user. The query-processing system listens continuously to the input audio stream, parses queries and takes appropriate actions in mid-stream. In some embodiments, the system processes queries in parallel, limited by serial constraints. In some embodiments, the system parses and executes queries while a previous query's execution is still in progress. To accommodate users who tend to speak slowly and express a thought in separate parts, the query-processing system halts the outputting of results corresponding to a previous query if it detects that a new speech utterance modifies the meaning of the previous query.

8 Claims, 11 Drawing Sheets

(56) References Cited

U.S. PATENT DOCUMENTS

| | | | |
|---|---|---|---|
| 2008/0004881 A1 | 1/2008 | Attwater et al. | |
| 2009/0018834 A1 | 1/2009 | Cooper | |
| 2015/0310863 A1* | 10/2015 | Chen .................. | G10L 15/26 704/235 |
| 2016/0148610 A1* | 5/2016 | Kennewick, Jr. ....... | G10L 15/18 704/240 |
| 2016/0203121 A1* | 7/2016 | Okabe .................. | G10L 25/63 704/257 |
| 2017/0110116 A1* | 4/2017 | Tadpatrikar ............ | G10L 15/05 |

OTHER PUBLICATIONS

Richard William Watson, User Interface Design Issues for a Large Interactive System, AFIPS Conference Proceedings, National Computer Conference, 1974, pp. 357-364, vol. 45, Stanford Research Institute.

Glória Branco, et al., Evaluation of a multimodal Virtual Personal Assistant, Voice Services and Platforms—Portugal Telecom Inovação, 2001, Porto, Portugal.

Jason D. Williams, et al., Preference, Perception, and Task Completion of Open, Menu-based, and Directed Prompts for Call Routing: a Case Study, Edify Corporation, 2003.

Bob Cooper, A case study on the planned and actual use of auditory feedback and audio cues in the realization of a Personal Virtual Assistant, Eleventh Meeting of the International Conference on Auditory Display, Jul. 6-9, 2005, Limerick, Ireland.

Ridong Jiang, et al., Web-based Multimodal Multi-domain Spoken Dialogue System, 5th International Workshop on Spoken Dialog Systems, 2014, Napa.

Fabrizio Ghigi, Incremental Dialog Processing in a Task-Oriented Dialog, INTERSPEECH, Sep. 2014, ISCA, Singapore.

European Extended Search Report, European Application No. 17208676. 1, dated Apr. 30, 2018, 8 pages.

* cited by examiner

FULL-DUPLEX UTTERANCE PROCESSING IN A NATURAL LANGUAGE VIRTUAL ASSISTANT

TECHNICAL FIELD

The disclosed embodiments relate generally to computer-implemented methods for providing a user with more intuitive reactions to the user's spoken input in a natural language virtual assistant.

Field of Classification: 704/246

BACKGROUND

In conventional systems, man-machine dialogs between a person and a virtual assistant or other natural language processing systems have a strict turn-taking policy. Such virtual assistants do not accept a new query from a user until the assistant's response for a previous query has been fully communicated to the user. This lack of flexibility results in unnatural communication.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
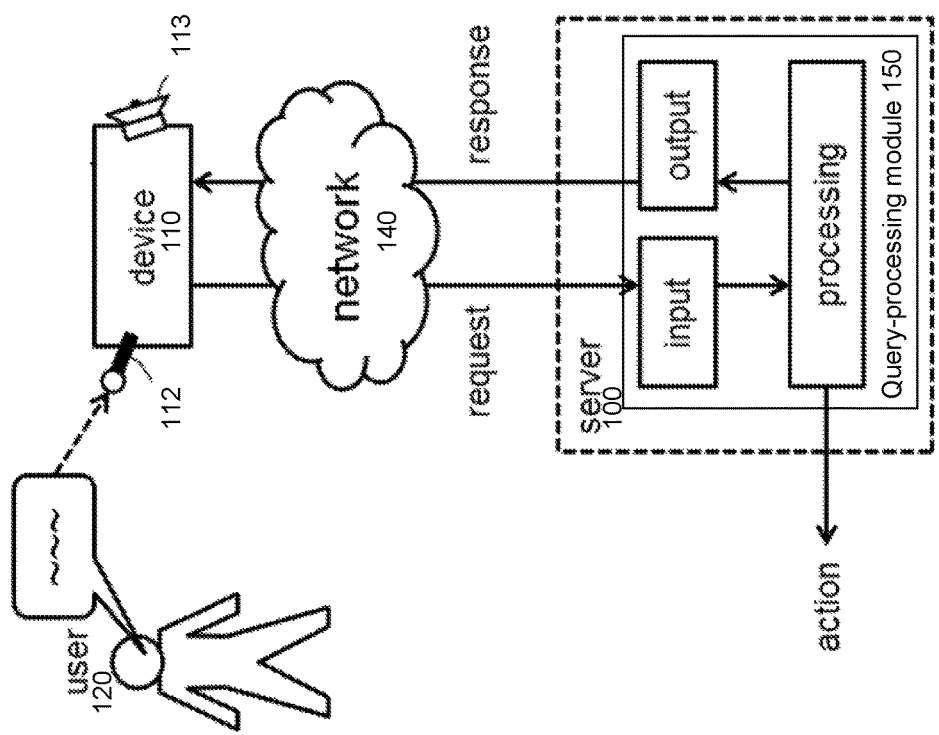
FIG. 1 shows a system environment in which query processing takes place, according to one embodiment.

FIG. 1 shows a system environment in which query processing takes place, according to one embodiment. Users of client devices 110 use speech to express their wishes, including requests for action (e.g., "create a calendar appointment for dinner with Karl at 7 PM today") and requests for information (e.g., "what is the weather tomorrow in Rome?").

In the embodiment illustrated in FIG. 1, the query processing takes place on a query-processing server 100 located remotely over a network 140. In other embodiments, however, the query processing is local, taking place directly on the client device 110, e.g., as part of a virtual assistant application installed on the client device. In some embodiments, speech is segmented and transcribed locally on the client device 110, while the processing performed on server 100 operates on text segments. In some embodiments, server 100 is distributed across a number of physical servers.

The client devices 110 are computing devices such as smart phones, tablets, laptop computers, or desktop computers, or a smart appliance or other device (e.g., a car, or a coffee machine, with data processing capabilities), or any other device that can input a natural language query and output a response to the query. The client devices 110 have sound input devices 112, such as microphones and A/D converters, that capture sounds and convert them to digital audio data, and sound output devices 113, such as D/A converters and speakers, that convert digital audio data to a corresponding audible output.

The network 140 (in embodiments in which a network is employed, such as that of FIG. 1) may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The query-processing server 100 and the systems of the client devices 110 may be implemented with various forms of hardware in different embodiments. In all embodiments, the query-processing logic is a set of computer-implemented algorithms, as further described herein. Finally, as will be apparent from the following discussion, the algorithms and processes described herein require implementation on a computer system, and cannot be performed by humans using mental steps in any useful embodiment.

Some embodiments use client devices to capture utterances and servers to process the utterances in order to form and execute queries. Some embodiments perform capture and processing in a single device.

Figure 2:
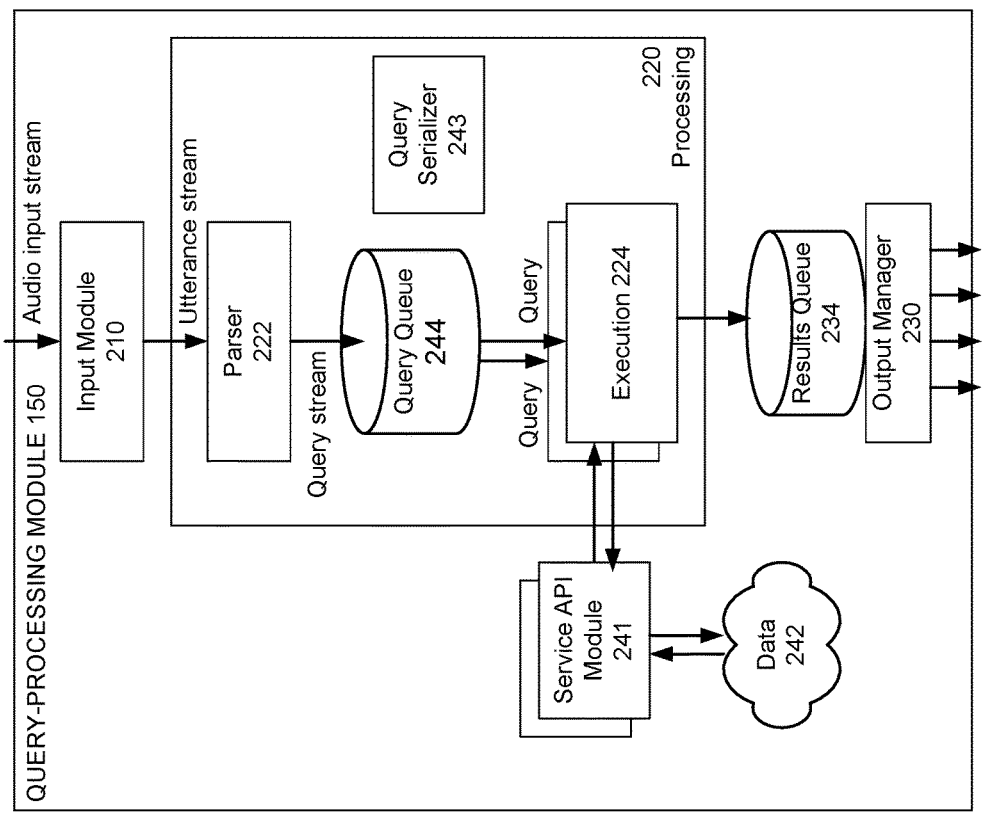
FIG. 2 illustrates components of the query-processing module, according to one embodiment.

FIG. 2 illustrates components of the query-processing module 150, according to one embodiment. An input module 210 receives as input a digital audio stream. The audio stream is captured by a sound input device 112 and it may represent a user's spoken query. An "utterance" is a contiguous segment of speech. The input module 210 segments input audio into utterances. To do so, it detects a beginning and end for each utterance, based on identifying a pause in the speech, or non-speech audio, or UI events such as a user making a gesture (swiping, pushing a button) or other means. For example, if a particular user says "what is the weather tomorrow", then pauses for some time interval (e.g., 500 ms), then continues with "in Rome", the speech input includes two distinct utterances separated by 500 ms of non-speech.

In the embodiment of FIG. 2, input module 210 outputs an utterance stream. Each utterance in the utterance stream is processed in turn by processing module 220. The first step in processing module 220 is parsing, using the natural language parser 222. In this disclosure, the terms "parse," "parser" and "parsing" are not used in the narrow sense of checking the syntax of a query against a natural language grammar, but in the broader sense of "recognizing" a query in terms of both its form and meaning. The parser 222 is thus a semantic parser, and its function is the recognition of queries. Query recognition 222, when successful, includes the construction of a representation of a query's meaning. The recognition of a query builds this representation and adds it to the query queue 244.

The parser 222 also rejects queries that are syntactically ill formed or semantically meaningless. The failure of a parsing attempt is handled by different systems in different ways. In some cases, an error message is sent to the user as a response. In other cases, no response is given. Either way, no query is added to query queue 244 for subsequent execution.

In an incremental embodiment of processing module 220, successive utterances are parsed as soon as they are available from the input module, and processing always goes forward in the input stream. In such an embodiment, parser 222 is an incremental parser. Algorithms for incremental parsing are known to people of ordinary skill in the art. In the context of incremental parsing, "parses" broadly refer to partially completed parses, as opposed to complete parses that make a query. Incremental parsers maintain in parallel all possible parses (or sufficiently likely parses) of the input stream, by updating (partial) parses each time an input token is added from the input stream. A query is recognized as soon as any of the partial parses becomes a complete parse, in both syntactic and semantic terms. When this happens, the incremental parser outputs a corresponding query data structure and adds it to the query queue 244. At this point, the parser resumes processing of the input stream from the current state of parsing. The state of parsing includes its position and direction in the stream, and the state of all parallel partial parses.

In some embodiments, recognizing a query requires the presence of an end-of-utterance boundary at the end of the query. In other embodiments, query recognition does not require an end-of-utterance boundary to complete a query. In the latter embodiment, after receiving "what is the weather tomorrow" from the utterance stream, incremental parser 222 is able to recognize a first query, "what is the weather," which it adds to the query queue 244, while maintaining the state of parsing. Next, "what is the weather tomorrow" is recognized as a second query. (In an embodiment where the end-of-utterance is needed, only the second query would be recognized.) The incremental nature of the parser gives it the ability to be sensitive to segmentation factors, such as the duration of a pause between "what is the weather" and "tomorrow," to recognize one or two queries in the input "what is the weather tomorrow." The extended input "what is the weather tomorrow in Rome" (with "in Rome" following "what is the weather tomorrow") yields an additional query. In this case, three successive queries may be recognized.

In embodiments using a non-incremental parser, a similar output is achieved at the cost of some additional processing. In effect, a non-incremental parser is restarted on concatenations of recent utterances. (In this disclosure, the operator "+" is used to denote the concatenation of audio segments.) For example, if utterance U1 is the speech segment "what is the weather," U2 is "tomorrow" and U3 is "in Rome", a non-incremental parser must be restarted in turn (from a cold start) to take as input each of the three utterances U1, U1+U2, and U1+U2+U3. While, in some embodiments, additional complexity is involved, non-incremental embodiments of the techniques presented are possible, which offer query recognition capabilities similar to those of incremental embodiments.

The shared query recognition capability is as follows. Given as input a stream of utterances {Ui, i=0 to N} a parser 222 (be it incremental or not) can generate a stream of queries {Qk, k=0 to M} where query Qk is recognized from an utterance, Ui, or from a concatenation of utterances, Ui+ . . . +Uj.

In some embodiments, input module 210 performs automatic speech recognition (ASR) and transcribes every identified utterance into a text segment, which is then presented as input to parser 222. In this case, the stream received as input by parser 222 is not made of audio segments, but of text segments, or perhaps of words. Parser 222 operates accordingly, and one skilled in the art would readily adapt query-processing module 150 to work in this manner.

When parser 222 successfully recognizes a query, it creates as output a query data structure that includes notably the meaning of the query, expressed as an actionable data structure. The query data structure encodes not only the meaning of the query, in a form suitable for subsequent execution, but any additional data generated by parser 222 and useful for purposes other than execution. For convenience, the term "executing a query" will stand for "executing the query data structure" or alternatively, for "executing the actionable meaning of the query." For example, in response to the query "what is the weather tomorrow", parser 222 produce as output a query data structure that encodes the core question "what is the weather" and a qualifier list including the qualifier "tomorrow." It creates a query data structure of type "weather query" with a field "when" set to the value of "tomorrow" in the current context, time_1, and a field "where" set by default to the current location, such as city name and a latitude-longitude pair, lat_long_1. To answer the query, this command data structure might be executed by way of a procedure call WEATHER_DATA(lat_long_1, time_1) that accesses a web-based weather service.

Executing certain queries involves performing actions (e.g., creating a calendar appointment for a specified time with a specified person) or looking up information. For example, executing a weather query accesses a web-based weather service. In the example scenario above, the weather service describes tomorrow's weather as a textual description "partly cloudy, with highs in the 80s and lows in the 60s" and builds associated visuals. In some embodiments, fulfillment of a query by execution module 224 is performed on the same system as the query-processing module 150. In some embodiments, fulfillment of a query involves a call to a remote service (e.g., a flight reservation system) through service API module 241.

Fulfillment of a query may, in some cases, require a significant amount of time. In this case, processing queries in parallel is desirable. Processing module 220 supports the execution of multiple queries in parallel, by using multiple instances of execution module 224. Of course, there is no opportunity for parallel execution of two queries Q1 and Q2 when Q1 has been answered before the start of Q2's processing. A query is called "active" if the query exists (it has been recognized by parser 222, and the corresponding query data structure created) and its execution module is not complete. Completing execution produces a result record that is entered in the results queue 234. The candidates for parallel execution are queries that are simultaneously active. When queries are simultaneously active, the decision to allow their parallel execution is made by the query serializer module 243.

The execution of a query may produce a response that will be displayed to the user. For example, a request for information (e.g., "what is the weather tomorrow") inherently calls for a response to the user. In some embodiments, all queries result in a response (e.g., a request for action also produces a response that indicates whether the action succeeded or not). In the embodiment of FIG. 2, this happens in two stages. First, execution of a query by an instance of execution module 224 creates a result record as output. Second, output manager 230 creates an actual response to be presented to the user, based on a result record from the results queue 234. In the embodiment of FIG. 2, result records created by instances of execution module 224 are entered into a results queue 234, and output manager 230 pulls result records out of results queue 234. The results queue 234 is an inter-process communication queue, and it performs a parallel to serial conversion for the generated result records.

The output manager 230 outputs the response data (if any) to the user. In some embodiments, the response data is output in different forms, depending on the nature of the data or of the capabilities of the client device 110 on which the response will ultimately be given to the user. For example, the output manager 230 could cause the response to be output in spoken form (e.g., via text-to-speech algorithms), or in visual form (assuming that the client device 110 has visual user interface capabilities). Further, each component may have a short form and a long form, to be used under different circumstances. The output manager 230 may also decide the order in which responses are displayed.

The service API module 241 contains logic that supports the execution of particular queries using API requests for network-based services. For example, the query "what is the weather tomorrow?" is executed by accessing a third-party web-based weather service. The service API module 241 would map the query to a URL, including parameters representing the specified weather characteristics (e.g., &time=tomorrow). In some embodiments, a choice is made among competing services with similar functionality, such as one provider of weather services,\vs. another, for reasons including availability and price.

In the embodiment illustrated in FIG. 2, queries are stored in a query queue 244. Queries are entered into query queue 244 as soon as they are created by parser 222. The query serializer module 243 determines which queries may be executed in parallel, and which cannot; it is discussed later. Queries are removed from queue 244 when their execution by execution module 224 has been completed. The execution of a query is complete when the corresponding result record been added to a results queue 234. The results queue 234 is processed by output manager 230.

In one embodiment, the parallel execution of queries is allowed to the largest extent possible. In such an embodiment, processing module 220 executes queries in parallel by running multiple instances of the execution module 224. Two queries may be executed asynchronously if possible, that is: (1) the queries are both active at the same time (the query queue 244 contains all active queries); and (2) there is no serial constraint to prevent the parallel execution of the two queries. The query serializer module 243 determines the presence of serial constraints among the active queries, as discussed below. These definitions support the parallel execution of a number of active queries. After the serial constraints among all active queries are determined, sequencing choices (deciding which queries are eligible for immediate execution) are simple: any query that has no serial dependency on a previous query is eligible to run. For example, suppose queries Q1, Q2, Q3 are active in the queue, and a serial constraint specifies that Q1 must be processed before Q3. There are no other serial constraints. In this case, queries Q1 and Q2 (that have no incoming constraints) are eligible for parallel execution. Q3 cannot run until Q1 has completed its execution. Once Q1 finishes, Q3 can execute. If Q2 is still active at that point in time, Q3 will be executing in parallel with Q2. In some embodiments, the degree of parallelism during the execution of queries is limited by other factors, such as resource limitations, that prevent parallelism from being exercised to the fullest extent possible.

Parallel execution can be implemented in many ways. In one embodiment, multiple computers are used to support the parallelism needed to execute queries from a query stream; this leads to a heavy use of computational resources. In one embodiment, multiple "processes" (in the sense of the Linux OS) are used to support parallelism in query processing. In one embodiment, a multithreaded process (again, in the sense of the Linux OS) supports multiple threads (also called light-weight processes) to enable parallelism. In another embodiment, parallelism is adequately simulated without threads, interrupts or timers, through cooperative scheduling. In a cooperative scheduler, a task (once made active) is allowed to run until it returns control voluntarily. The cooperative scheduling approach, when applicable, has the advantage of a low overhead. It requires no hardware support and can be used in small embedded systems, but query execution is usually too complex to qualify for a thread-less scheduler.

The query serializer module 243 has the responsibility to decide if two queries Q1 and Q2 have a dependency relationship (a serial constraint) that determines the relative order in which processing module 220 should process the queries. Two active queries Q1 and Q2 will be allowed to execute in parallel, unless query serializer module 243 determines that, say, Q1 must be executed before Q2.

Query serializer 243, as its name indicates, performs serial constraint recognition on queries, not on utterances. This is because utterances are un-interpreted speech segments; thus, until they are recognized as queries, utterances do not allow the detection of dependency relationships that result in serial constraints. Still, it is convenient to refer to an utterance as if recognized as the corresponding query, and this convention is employed below. For example, it is intuitive (though technically incorrect) to refer in the same way to the utterance "what is the weather" (where the quoted text stands for a segment of speech) and to the query "what is the weather" (where the same quoted text stands for a parsed and interpreted query). Using this definition, it will be convenient to say that utterance $U_2$ is a "continuation" of $U_1$ when (1) $U_1$ is recognized as a query Q1, and (2) the concatenation $U_1+U_2$ of the two successive utterances is recognized as a query Q2. According to this definition, the utterance "in Rome" is a continuation of the utterance "what is the weather tomorrow" because the concatenated utterance "what is the weather tomorrow in Rome" can be recognized as a query, according to most grammars. In contrast, the utterance "at a 2% interest rate" is not a continuation of the utterance "what is the weather tomorrow" because the utterance "what is the weather tomorrow at a 2% interest rate" is not recognizable as a query in most grammars.

The detection of serial constraints by query serializer 243 is primarily governed by logical dependencies, as explained below, but pragmatic considerations (such as computational cost, processing delays, or cost of accessing APIs) play a role as well. The query "what is the weather in Rome" can execute in parallel with the query "what is the weather" (a question about the local weather) because it is a fair speculation that the weather in Rome is independent of the local weather (in some other part of the world); and while in Rome, it would be surprising if two queries involving the local weather would be issued in succession. Speculating (or verifying by looking at geolocation distances) that the weather in Rome and the local weather do not have a logical dependency, they can be executed in parallel.

For another example of serial constraint recognition, consider the utterance "Find Chinese restaurants near my hotel" followed by the utterance "and sort them by rating." In this example, the second utterance is a continuation of the first one, but unlike the previous example, the answer to the second query is best seen as based on the answer to the first one, hence a serial constraint is detected, preventing parallel execution. (Although it is possible to execute the two queries "Find Chinese restaurants near my hotel" and "Find Chinese restaurants near my hotel and sort them by rating" in parallel, this is less computationally efficient.)

In one embodiment, the query serializer 243 is tightly integrated with parser 222, and determines whether an ordering dependency is present between queries Q1 and Q2 based on the state of the parser during query recognition. The previous example shows that the response to a query Q2 can depend on the response to a prior query Q1 whenever Q2 adds a qualifier ("and sort them by rating") to an information-seeking query ("Find Chinese restaurants near my hotel"). For another example, the utterance "with four stars" is a continuation of the prior utterance "Show me hotels in downtown San Jose", and serves as a qualifier to it, in that it selects the subset of hotels in downtown San Jose that have four-star ratings.

In some embodiments, an ordering constraint is detected when query serializer 243 determines that a new query depends on the context of previous dialog. This may happen if a new query depends on the answer to the previous query (as in the hotel example given above) or more broadly, a recent query. Another example of a result dependency is the query "what is the temperature in Chicago?" followed by "is it colder in New York?" Here, the term "colder" implicitly refers to a previous temperature, which one expects to find mentioned in the previous dialog. Here, the previous temperature is not known until the first query has been executed. This is a logical (i.e., data flow) dependency, which results in a serial constraint between the queries, preventing parallel execution.

In one embodiment, dependency checking is based on maintaining and accessing a representation of the conversation state (a data structure that holds selected information from the previous dialog). Some queries are dependent on conversation state, but this does not imply a serial constraint. When a new query depends on a recent query, but not on the answer to it, a serial dependency may not exist. For example, in order to determine the meaning of an unresolved query such as "How is the weather there?" one must know what the location there stands for. Co-reference resolution techniques address this problem. The absence of the location information may or may not be grounds for a serial constraint. For example, if one says "Find me a flight to New York on Saturday" followed by "How is the weather there?" there is no serial constraint, because the location can be resolved using the previous dialog data (the conversation state) when parsing the second query. Conversely, if one says "What town was President Obama born in" followed by "How is the weather there?" there is a serial constraint, because the needed location can only be resolved by executing the first query.

To respond to another semantically incomplete query such as "what if the interest rate is 4%?" an embodiment may examine the recent dialog for a prior query that involves the use of an interest rate, and find a previously used formula (such as in a mortgage calculation) that depends on a specified interest rate. The formula may then be re-evaluated with the 4% interest rate substituted for the previous rate. In such a case, there is no serial constraint. Stated more generally, if a dependence of an incomplete query upon recent interactions can be handled at recognition time (e.g., because the result is within the conversation state, or within the cached result of a prior query), as opposed to requiring query execution to obtain a result, there is no serial constraint, and parallelism is allowed at query execution time.

The recognition of a query can determine reliably whether the execution of a query depends on that of previous queries. One way this happen is through shared values. After the query "How is the weather there?" is answered, a temperature is expected as part of the answer. A subsequent query "what is that in Celsius?" calls for using a temperature value from the prior weather query's answer, creating a serial constraint between the corresponding queries.

Parallel to serial conversion is achieved by way of the results queue 234. The queue receives result records asynchronously from parallel instances of the execution module 224, and the single-threaded output manager 230 handles the queue serially. An entry in the results queue 234 (a result record) can be complex. It may include multiple multimedia components, such as a short text response or a long text response for display on a screen, a short text response with text-to-speech (TTS) markup or a long text response with TTS markup to convert the text to speech audio using the client's TTS software, a short speech response or long speech response already converted from text to audio using the server's TTS software. Besides, it may also include pure audio or music segments, video segments with or without audio, graphic elements, animations, and metadata about the visual or auditory display of all such components. In addition, a result record entry may convey scripts, rules or constraints that apply to the preferred use of the result record by the output manager 230.

The following is a more detailed description of various embodiments of the output manager 230. A result record may contain multiple content components, such as text for printing, text with markup for conversion to audio by a TTS module, recorded audio to be played; visual elements for display including static images, animations or video to be played; and generally any multimedia content accessible by way of external references such as URLs. A result record may also include details about what parts of the multimedia data should be displayed under specific circumstances. In some embodiments, output manager 230 selects specific multimedia content that users see or hear. In some embodiments, the choice is left in whole or part to a client device.

The output manager 230 is primarily responsible for the order of presentation of the content. When processing queries in parallel, result records are received by results queue 234 in an order that differs from the original query order. In some embodiments, constraints are specified by the result records so as to constrain the order or timing of delivering multimedia content to the user. The output manager 230 has control of a user's audio-visual output devices, notably in terms of sequencing events and screen space management.

The output manager 230 is single-threaded, for any single user. This ensures that the user experiences result in a controlled time order. Although result records are obtained asynchronously, results queue 234 serializes them. Output manager 230 is then able, by reading the results queue 234, to access the entire sequence of active results. This means in particular that the output manager 230 does not have to pull result records out of the results queue 234 in the order of the queue.

Some embodiments of the results queue 234 use shared memory to store the result records themselves, and only store pointers to the shared result records in an inter-process queue. Various ways to implement inter-process queues are known to ordinarily skilled practitioners. Some embodiments are based on pointers and links. Some embodiments use a circular array with a head index and a tail index. This is feasible if the queue elements have a fixed element size (result records generally have varying sizes, but pointers to them have fixed sizes) and the queue has a fixed maximum size, which is typically adequate since a small degree of parallelism is sufficient for most applications. In a circular array embodiment, output manager 230 is able to peek at elements other than the head of the queue in order to better inform scheduling choices.

The output manager 230 takes scheduling constraints into account. Such constraints may be known through global defaults. For example, output audio segments may not overlap in time, unless otherwise specified. The non-overlapping rule applies by default both to audio from TTS and to music audio or other recorded audio. However, some audio (such as soft background music, or special-purpose sounds) may escape the rule and be played while foreground audio is playing. In some embodiments, constraints other than the default constraints are specified as part of the multimedia result records. The distinction of background audio (not subject to the non-overlapping rule) may be specified in a result record.

Scheduling constraints may distinguish between two types of events: instantaneous events and continuous events. A frequent type of constraint is a temporal relationship between events. A "time synchronicity" constraint states that a specified point in time (an instantaneous event, or the beginning or end of a continuous event) should be scheduled synchronously with another point in time (similarly defined by reference to events). A "precedence" constraint states that an event must be scheduled before (or after) another event. Continuous events have a time extent. Constraints can state that a continuous event is interruptible, or not interruptible, under certain conditions. A constraint can state the conditions under which a continuous event may be overlapped with other events. For example, the default constraint associated with a TTS audio segment is that it cannot be overlapped with any another audible event, unless said event is background music that is played relatively softly according to some appropriate definition of relative loudness. Continuous events include:

Playing an audio (or music) segment
Playing a video segment
Playing a TTS audio segment
Keeping a visual element (text, graphic, or animation) visible on a display screen Instantaneous events are subject to synchronicity and precedence constraints. They include:

The start [or end] of an audio (or music) segment
The start [or end] of a video segment
The start [or end] of a TTS audio segment
The appearance [or disappearance] of certain text on a part of a screen
The appearance [or disappearance] of certain graphic on a part of a screen
The appearance [or disappearance] of certain animation on a part of a screen
The scrolling off the screen of a specific visual element
A point in time N seconds before, or N seconds after, any of the above events The set of constraints given to the output manager 230 may be over-determined or under-determined. In order to process constraint sets and detect over-determined ones, the output manager 230 may rely on simple procedures, such as the following sequence of steps:

1) Partition events into synchronous groups according to synchronicity constraints;
2) Map existing precedence constraints among events to corresponding precedence constraints among synchronous groups:
   a) If a synchronous group must be both before and after another synchronous group, merge the groups; iterate this step until no further change can be made;

3) If scheduling conflicts are still present, one or more of the following strategies may be used (the order and availability of the strategies depends on operating modes):
   a) Use visual icons to allow the user to control the playing of audio segments (this is further described below);
   b) If two audio segments fail the non-overlap test, drop at least one constraint to revert to the simpler approach of playing the audio segments in the same order as the corresponding queries;
   c) Check for interruptible audio segments, and use trimming.

In the absence of sufficient constraints from result records to determine a schedule, the output manager 230 will add further constraints of its own to complete a schedule. In doing so, it typically falls back on default strategies. In the absence of constraints to the contrary, audio segments (including the audio from TTS) are played in order of the result records in the queue. This is the default strategy. This order is not always identical to the original order of the queries. In the latter case, the output manager 230 may peek into the queue, after a short wait, in an attempt to preserve the original ordering.

For managing visual displays, one strategy that the output manager 230 can use is to replace a visual element (text or graphic) by another. In this case, the use of timing constraints allows sufficient time for users to read the display. Another strategy is scrolling. It is applicable when the display device has a scrolling area. A display device may be divided into multiple areas, each of which may be designated as scrolling or as non-scrolling. In some embodiments a scrolling area scrolls upwards, or downwards. In some embodiments, a scrolling area scrolls leftward and rightward. A request to display a visual element is aimed at a specific area, which may be scrolling or not. In either case, the request may require that the area be cleared before the display.

In some embodiments, scrolling adds a visual element at the top (or bottom) of a scrolling area, shifting other visual elements away as far as needed to make room for the new element. When the scrolling area gets full, visual elements are scrolled off the area and are no longer visible. Choices pertaining to a scrolling method, such as the direction of scrolling or whether the area is cleared when full, are made globally in some embodiments, and are driven by query-specific constraints in some embodiments. Two main variations of scrolling differ by the retention of scrolled data: in the "forgetting" variant, data that goes offscreen is cleared from internal memory and cannot be retrieved. In the 'remembering' variant, visual material that was scrolled off the screen is stored in a buffer, and can be scrolled back into view by swiping or other means. In some 'remembering' embodiments, the amount of buffering is specified in a constraint, as well as circumstances for clearing buffer data.

As discussed above, audio segments are played in a specific order determined by the output manager 230 (whether or not the order of the audio segments matches that of the queries that elicited them as response) but audio segments are played exactly once, in an order that is not specified by the user. An alternative embodiment offers persistent access to audio segments, allowing a user to play a "persistent" audio segment zero or more times. For an audio segment designated as persistent, the output manager 230 adds a visual GUI element that is associated with the audio segment. The visual element is a clickable or tappable area of a screen, or equivalent. By clicking or tapping the visual element, a user can trigger the playback of the corresponding audio segment. This is specifically useful when audio has been interrupted, or is played out of order. In some embodiments, such visual elements are displayed in a scrolling area of the forgetting or remembering type, according to an operating mode of the output manager 230. Such modes may be driven by defaults corresponding to each multimedia element type (text, audio, video, static graphic, animation) or by constraints attached to result records to a specific query, or a combination of both. In some embodiments, an audio or video segment is only played when a corresponding GUI element is tapped. This is useful after a short response such as written text or TTS audio has already been given, in order to give a user the option to get more details.

FIGS. 3-10 are diagrams illustrating the handling of user speech over time in different scenarios, according to various embodiments. Time is illustrated along the horizontal axis, and the different operations (listening, user speech, execution, and response) are illustrated in different portions of the vertical axis. The "listening" operation represents the input module 210 of FIG. 2 receiving and segmenting input audio data for inclusion as new speech utterances in the utterance stream. The "user speech" operation represents a user providing spoken input to the client device 110, thereby creating utterance stream input data. The "processing" operation represents the processing of the processing module 220 of FIG. 2 (recognition 222 and execution 224). The "response" operation represents the creation of response data by the output manager 230. Multimedia response data may be presented to users in spoken or visual form as well as other forms, but in FIGS. 3-10 they are depicted as time segments.

Figure 3:
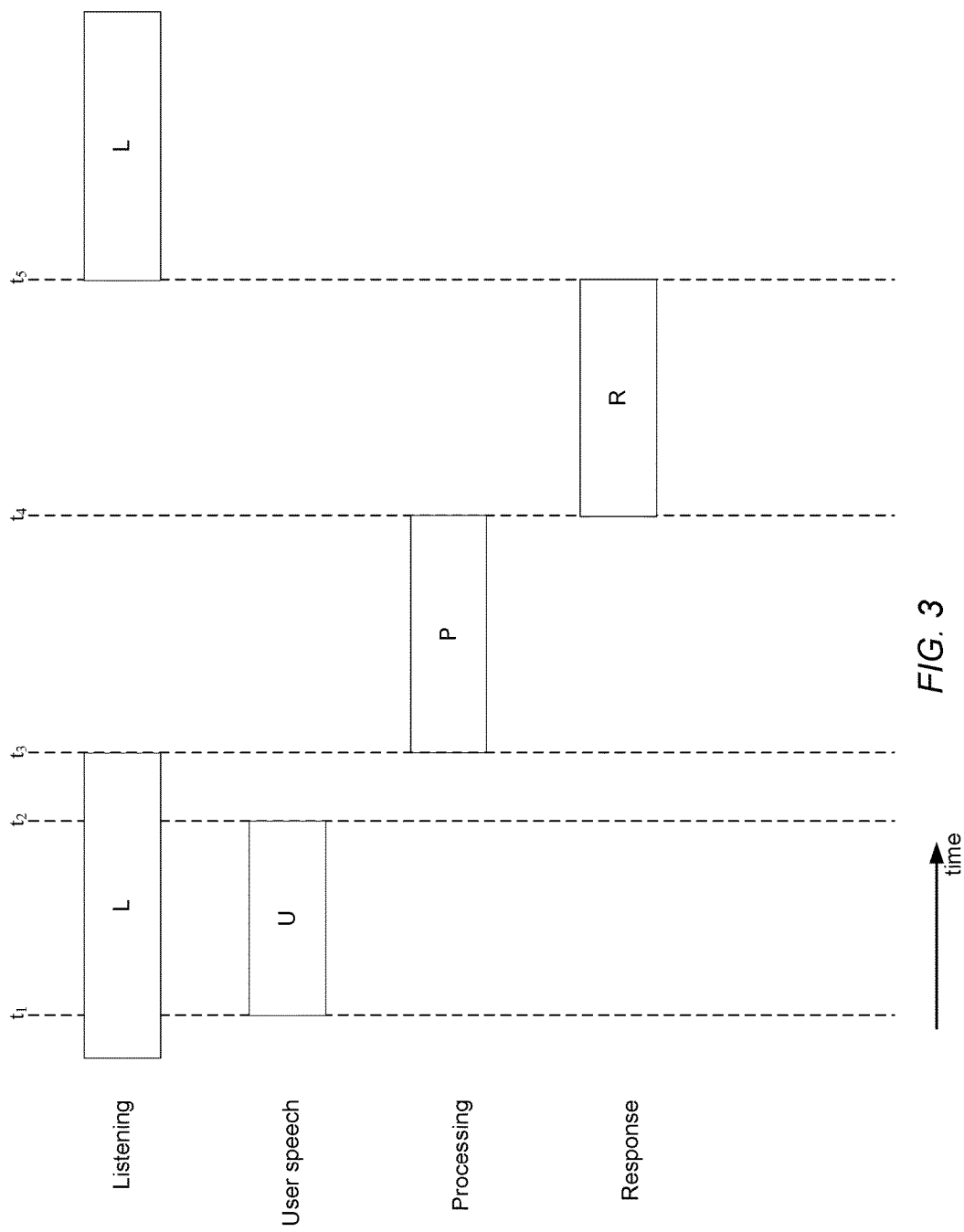
FIGS. 3-10 are diagrams illustrating the handling of user speech over time in different scenarios, according to various embodiments.

FIG. 3 illustrates a "half-duplex" embodiment where the input module 210 from FIG. 2 ignores additional input during the processing of a query and while outputting a response. Specifically, at time $t_1$ when a user begins utterance U, the input module 210 is listening for audio data defining an utterance. At a time $t_3$, shortly after the user ends the utterance at time $t_2$, the input module 210 determines that the utterance has ended and accordingly (1) stops listening for additional utterance stream input data, and (2) begins processing of the identified utterance U (that is, the audio input data between times $t_1$ and $t_2$). When processing of the utterance U has ended at time $t_4$, the output manager 230 outputs a response based on the results of processing (e.g., if U is a request for information, the response represents the requested information), such as in audio or visual form. When the output of the response ends at $t_5$, only then does the input module 210 again begin to listen for an additional utterance.

Figure 4:
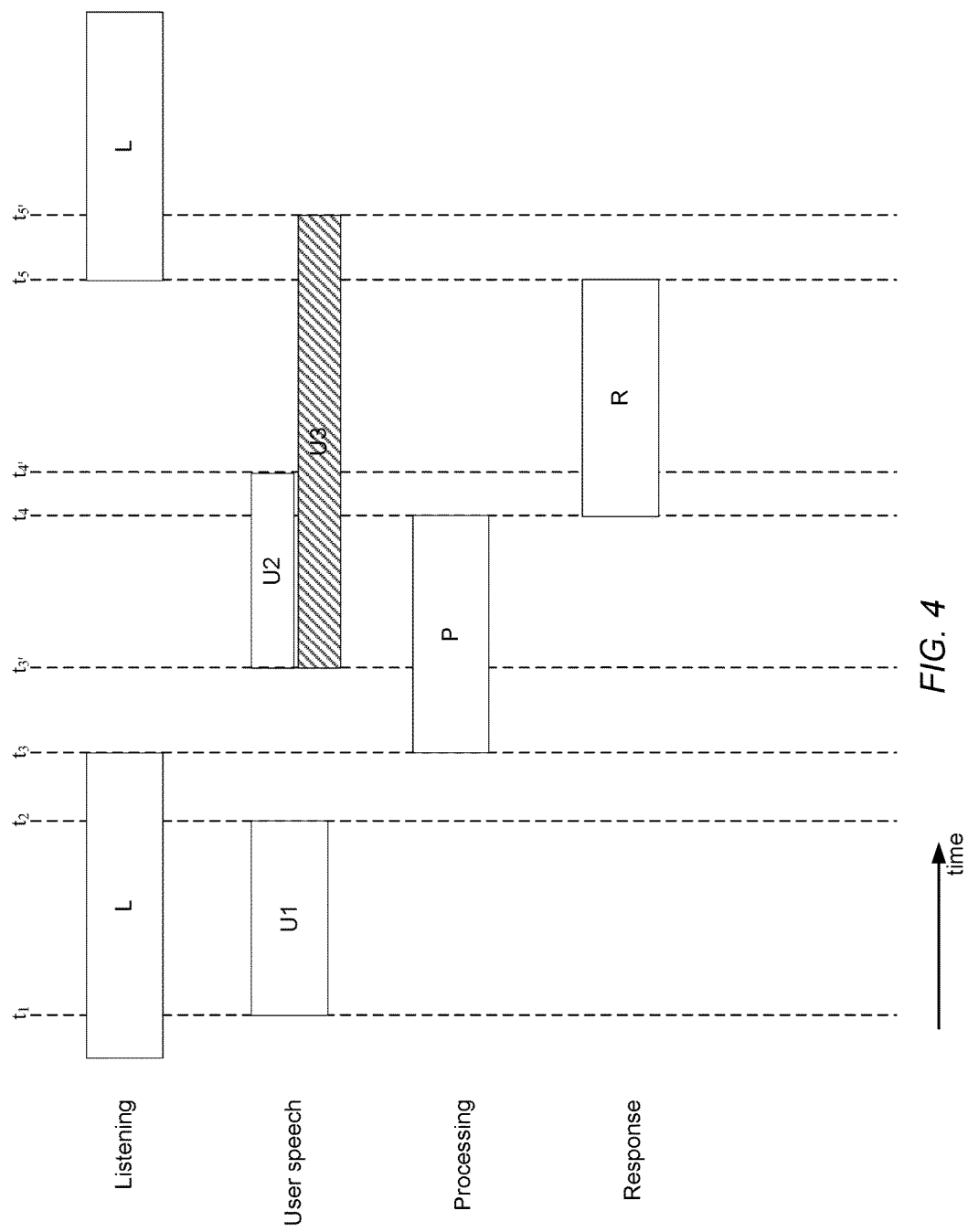

FIG. 4 illustrates the loss of utterance data resulting from the embodiment of FIG. 3. At time $t_3'$ between $t_3$ and $t_4$, while the processing is taking place, the user begins an additional utterance $U_2$ lasting until $t_4'$ (or, as alternative example, an utterance $U_3$ lasting until $t_5'$). Since the input module 210 does not recommence listening until $t_5$, all of utterance $U_2$ is lost (or, in the alternative example, all of $U_3$ is lost except the portion between $t_5$ and $t_5'$).

Figure 5:
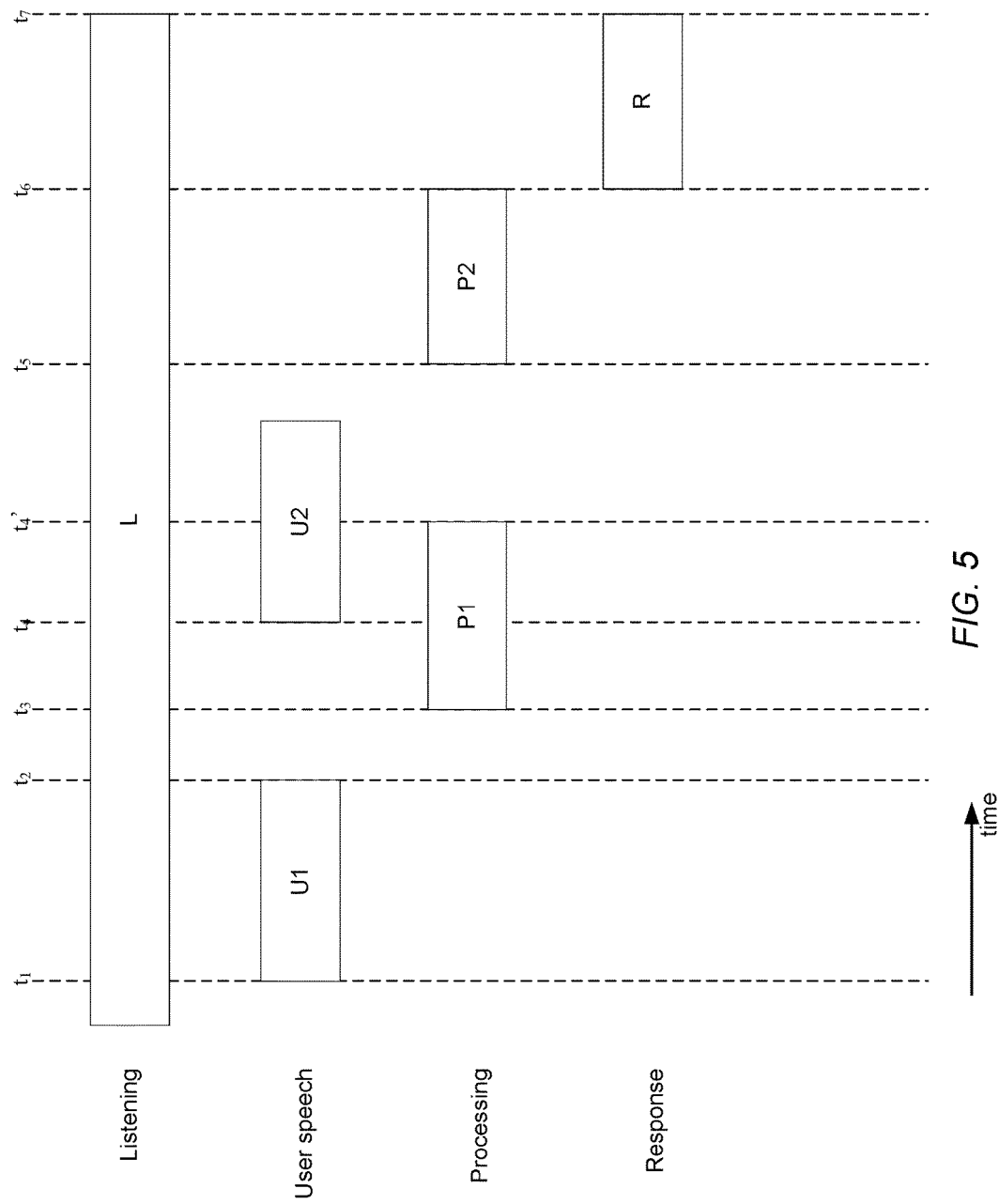

FIG. 5 illustrates continuous listening, and abortive action with respect to a first utterance in response to a second utterance, according to some embodiments. When the input module has recognized by time $t_3$ that an utterance $U_1$ has ended, the processing module 220 begins processing $U_1$. At a time $t_4$, while processing of $U_1$ is still taking place, the user begins a second utterance, $U_2$. (For example, a user says "what is the weather tomorrow" ($U_1$), pauses, and continues with "in Rome?" ($U_2$).) In some embodiments, the processing module 220 terminates processing $P_1$ before it completes due to the detection of the beginning of $U_2$; in other embodiments, the processing module 220 completes the processing of $U_1$, but also continues listening to $U_2$ while processing $P_1$ is taking place, so that it can perform processing $P_2$ on $U_2$ when $U_2$ is complete.

In the embodiment of FIG. 5, response R is provided after $P_2$ completes. If, after recognizing $U_2$, the query serializer 243 of FIG. 2 determines that $U_2$ is a continuation of $U_1$, the processing module 220 executes the query resulting from the concatenation of $U_1$ and $U_2$, and provides a response R based on this query, discarding any prior response based solely on $P_1$ by refraining from outputting such a prior response.

If, in contrast, the processing module 220 determines that $U_2$ was not a continuation of $U_1$, then the processing module 220 processes $U_1$ separately from $U_2$. Continuing a prior example, if $U_1$ were "what is the weather tomorrow" and $U_2$ were "Create a calendar appointment", then in some embodiments response R includes responses to both $U_1$ and $U_2$ (e.g., a description of the weather, and a statement of whether the calendar appointment creation was successful). In other embodiments (not illustrated in FIG. 5), the response manager 230 begins outputting a response based on processing $P_1$ before outputting the response R based on $P_2$, e.g., as soon as processing $P_2$ determines that $U_2$ is not a continuation of $U_1$.

Due to network latency or operating system inter-process communication latency it is possible that processing of the first utterance will, in some cases, begin after a user begins a second utterance. The invention ensures that the second utterance will not be lost. The processing module 220 must behave appropriately when it eventually receives the audio for the second utterance. In some cases, an appropriate behavior is to cancel the processing $P_1$. In some cases, an appropriate behavior is to allow $P_1$ to finish, then discard its result. In some cases, an appropriate behavior is to provide the results of $P_1$ independently of the results of processing $P_2$.

Figure 6:
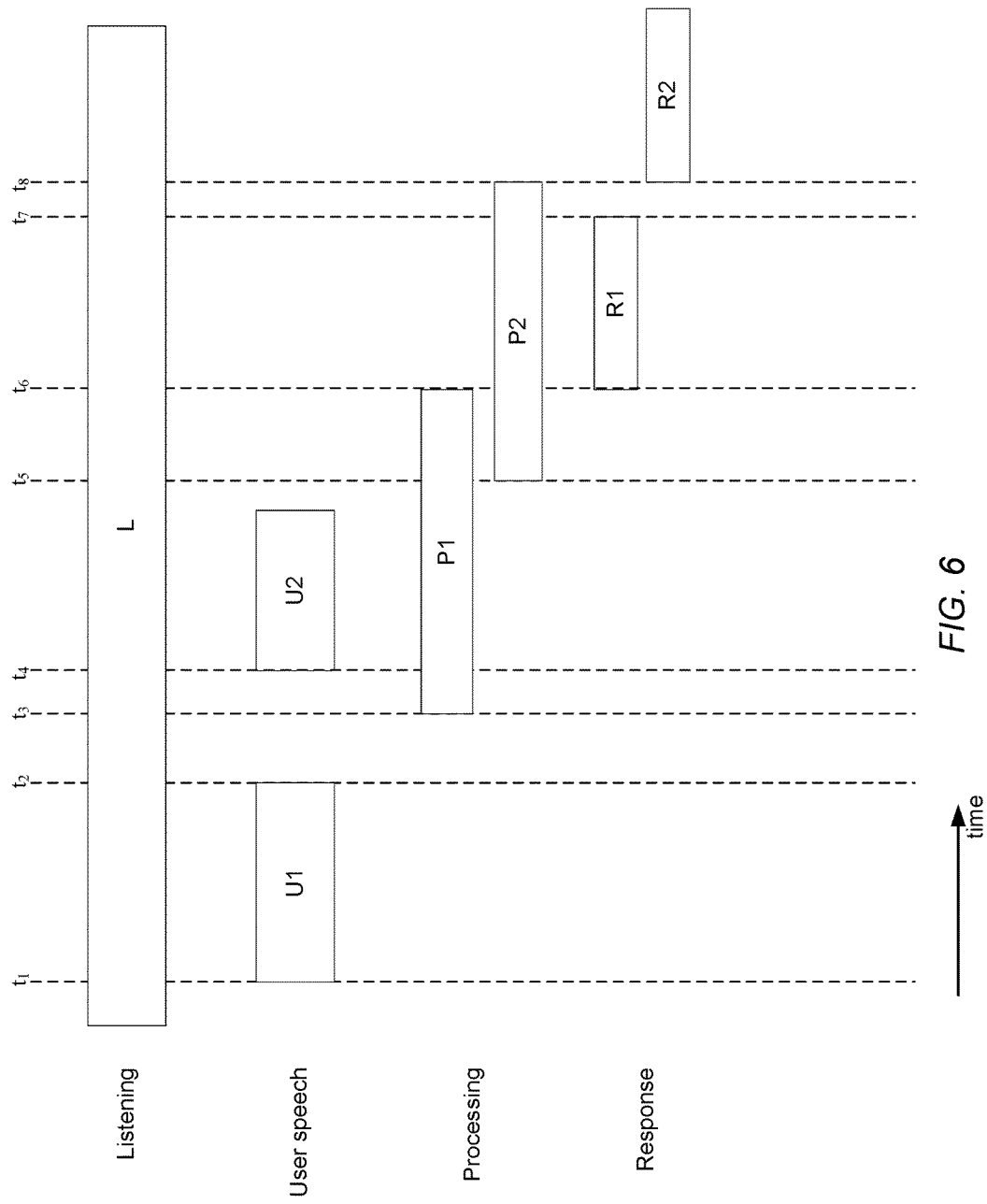

FIG. 6 illustrates parallel query processing, according to one embodiment. After the beginning of processing $P_1$ of $U_1$ at $t_3$, a second utterance ($U_2$) begins. The processing module 220 continues processing $P_1$ of $U_1$, and after completion of $U_2$ begins processing $P_2$ of $U_2$. (If the processing module 220 had determined that $U_2$ was a continuation of $U_1$, in some embodiments it would instead have processed the concatenation of $U_1$ and $U_2$.) Processing module 220 performs steps $P_1$ and $P_2$ in separate threads of execution so that they can occur in parallel, as they do between times $t_5$ and $t_4$ in the example of FIG. 6. The response module 130 outputs the responses corresponding to $U_1$ and $U_2$ (namely, $R_1$ and $R_2$, respectively) directly after the respective processing (namely, $P_1$ and $P_2$) has completed.

Figure 7:
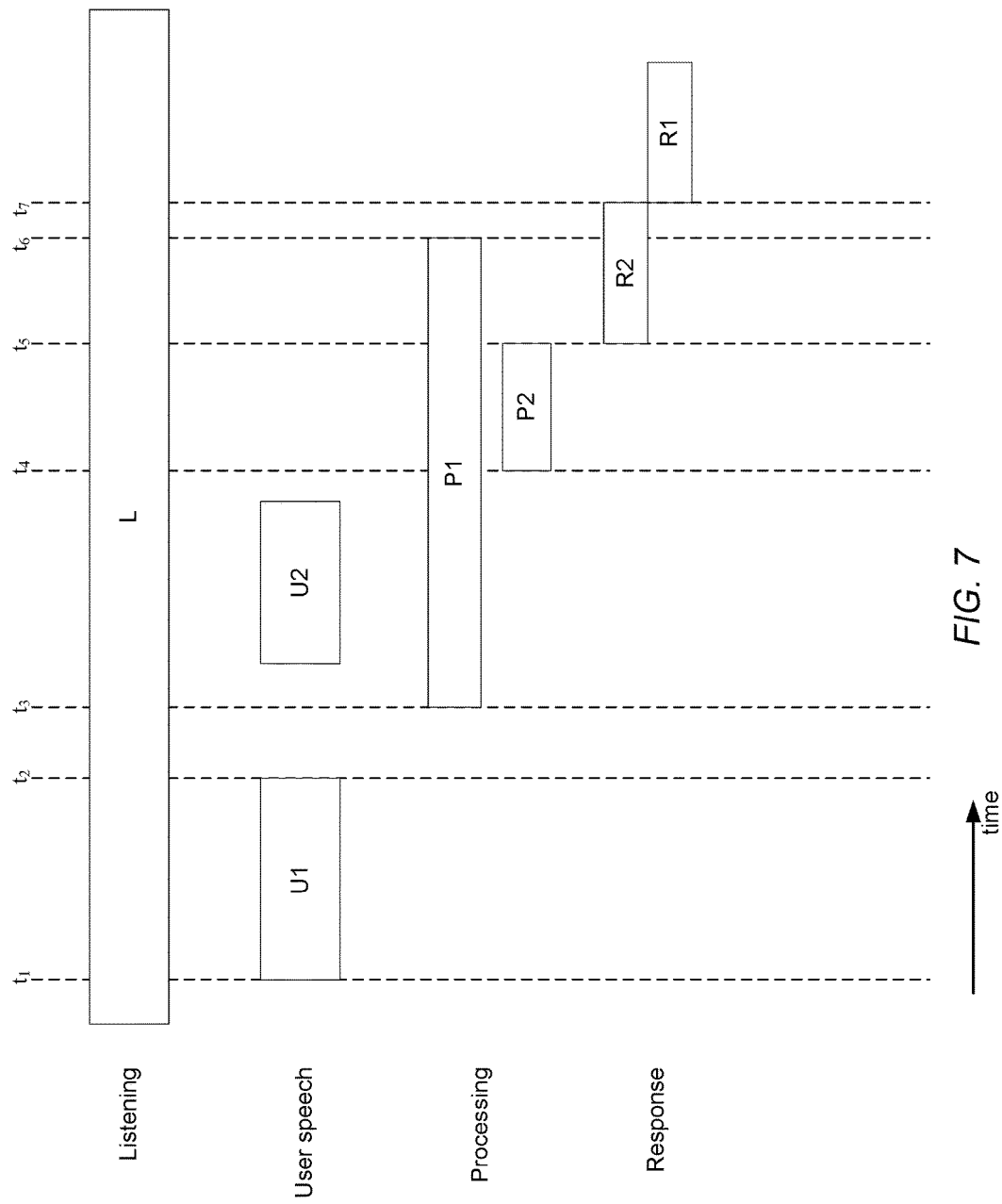

FIG. 7 illustrates out-of-order outputting of query responses based on the order of processing completion, according to one embodiment. Although utterance $U_1$ begins before U2, and processing $P_1$ for $U_1$ accordingly begins before $P_2$ for $U_2$, $P_2$ completes earlier than $P_1$ (e.g., because $P_2$ is more computationally-intensive, or requires use of an external service with greater latency, or the like). Accordingly, the response $R_2$ for $U_2$ is output earlier (starting at $t_5$) than the response $R_1$ for $U_1$ (starting at $t_7$). In the embodiment illustrated in FIG. 7, the output manager 230 delays beginning providing the response $R_1$ until time $t_7$, when the outputting of $R_2$ completes, even though the response $R_1$ was ready at earlier time $t_6$. Such a delay is beneficial where the responses are output in a manner for which outputting overlapping responses would be distracting, such as when the responses are output audibly. In other embodiments (not illustrated in FIG. 7), or for situations where the different responses may be output at overlapping times without being distracting to users (e.g., where the responses may be output visually in different portions of a visual user interface), responses ready at a later time need not be delayed until earlier response are fully output.

Figure 8:
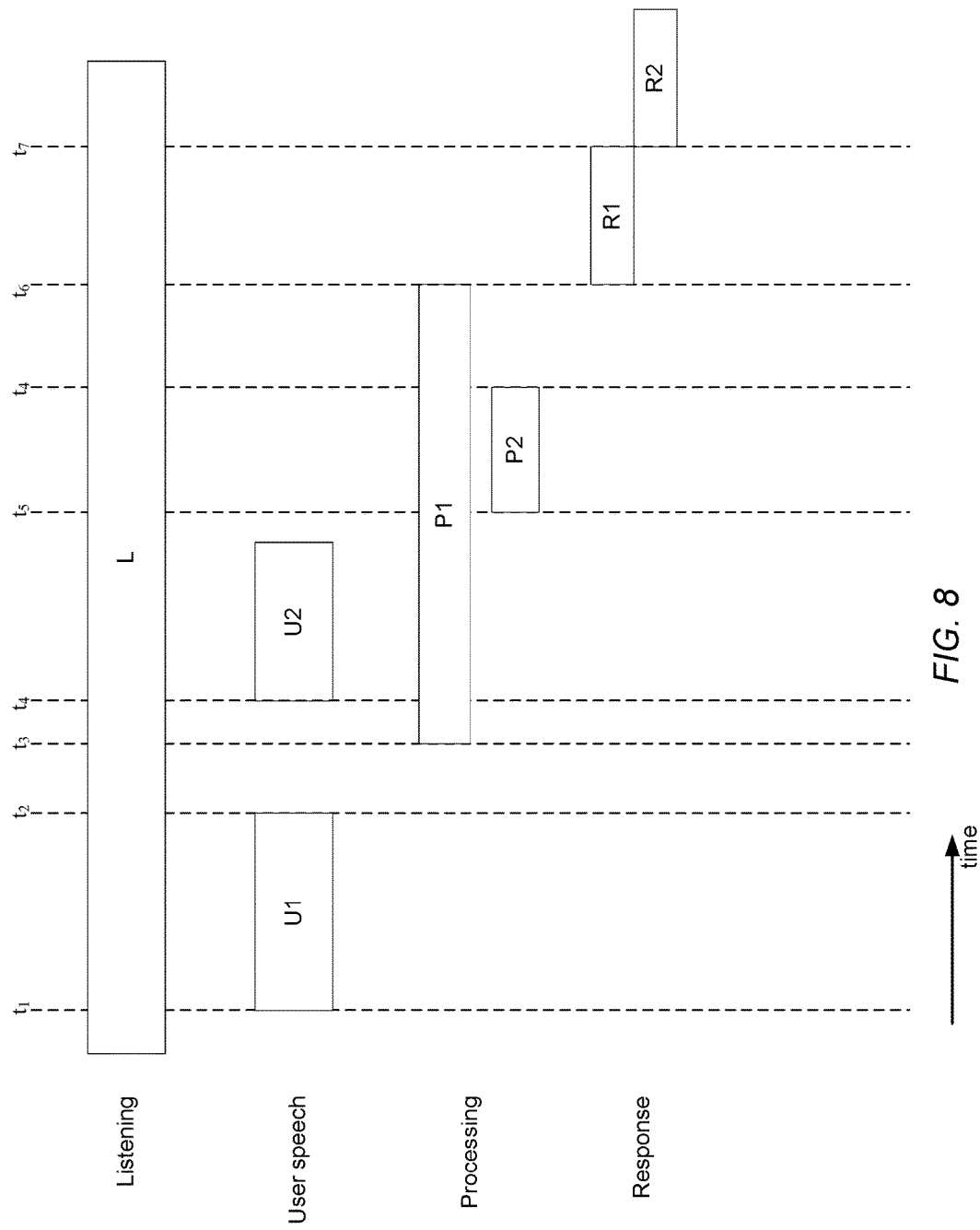

FIG. 8 illustrates an embodiment in which the responses are output in an order corresponding to the order in which their corresponding utterances were received. That is, since $U_1$ was received before $U_2$, corresponding response $R_1$ is output before $R_2$, with the output manager 230 delaying the outputting of any responses until after the processing $P_1$ of the first utterance $U_1$ has completed. Providing results in the same ordering as their corresponding utterances is valuable in some instances, such as when the results are of similar types and not readily distinguishable to the user, e.g., where both $U_1$ and $U_2$ pertain to the state of the weather. As noted above, in some embodiments or scenarios, $R_2$ could be output partially or entirely overlapping with $R_1$ in time. This is acceptable, for example, in situations where the results are of disparate types and hence readily distinguishable to the user, such as when the first result is about the weather and the second result is about a population count.

Figure 9:
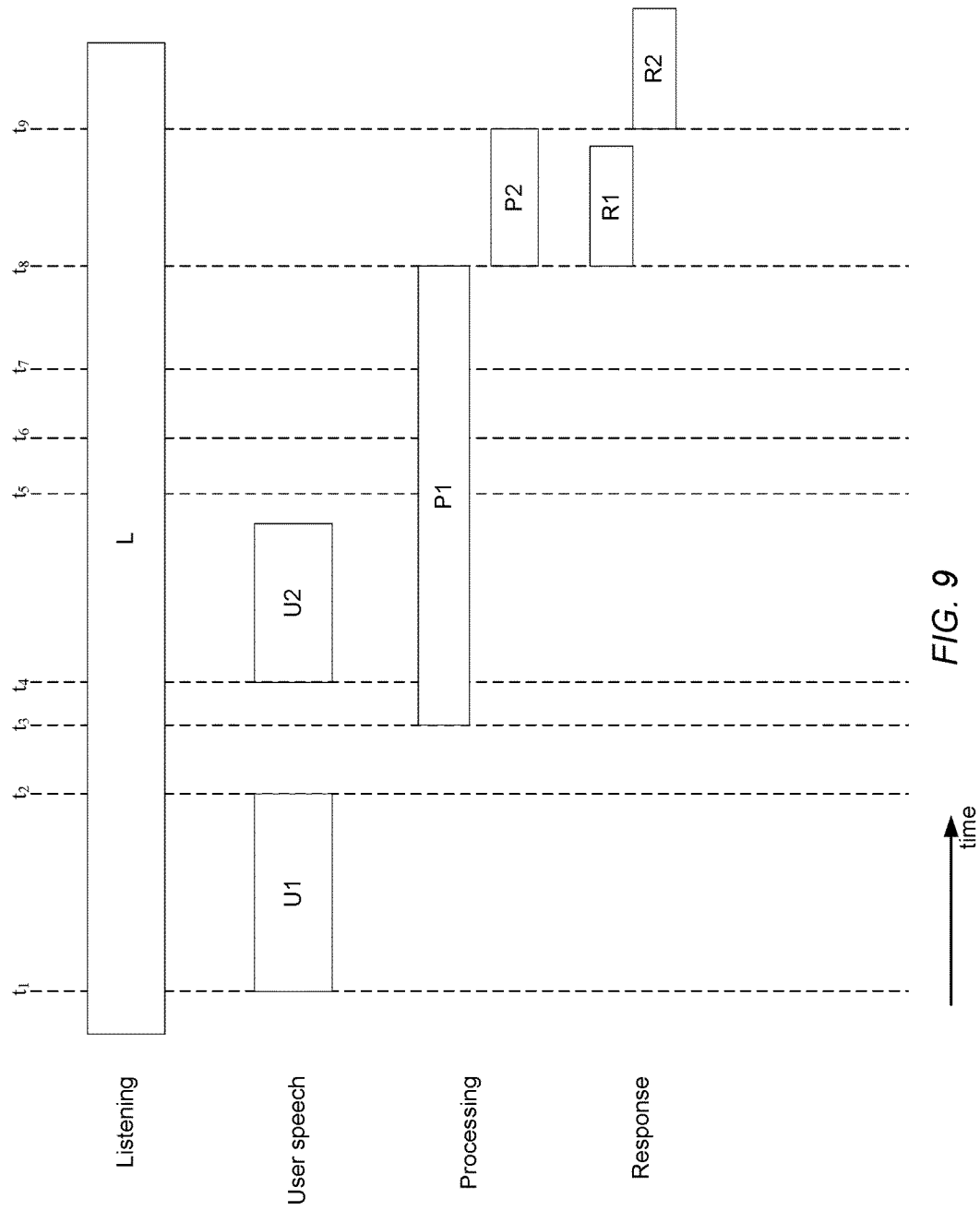

FIG. 9 illustrates the delaying of providing a second response based on a dependency between consecutive utterances, according to one embodiment. After the input module 210 detects the end of utterance $U_2$, the processing module 220 may determine by time $t_6$ (e.g., by successfully attempting to parse the concatenation $U_1+U_2$) that $U_2$ is a continuation of $U_1$, and that the response to $U_2$ will depend on the response to $U_1$, as discussed above with respect to the query serializer. Accordingly, the processing module 220 delays the execution phase of processing until $P_1$ has completed (and response $R_1$ has accordingly been computed). Once $P_1$ has completed at time $t_8$, the processing module performs the execution phase of processing $P_2$, basing the response $R_2$ on the response $R_1$, and outputting $R_2$ at $t_9$, when $P_2$ has completed.

Figure 10:
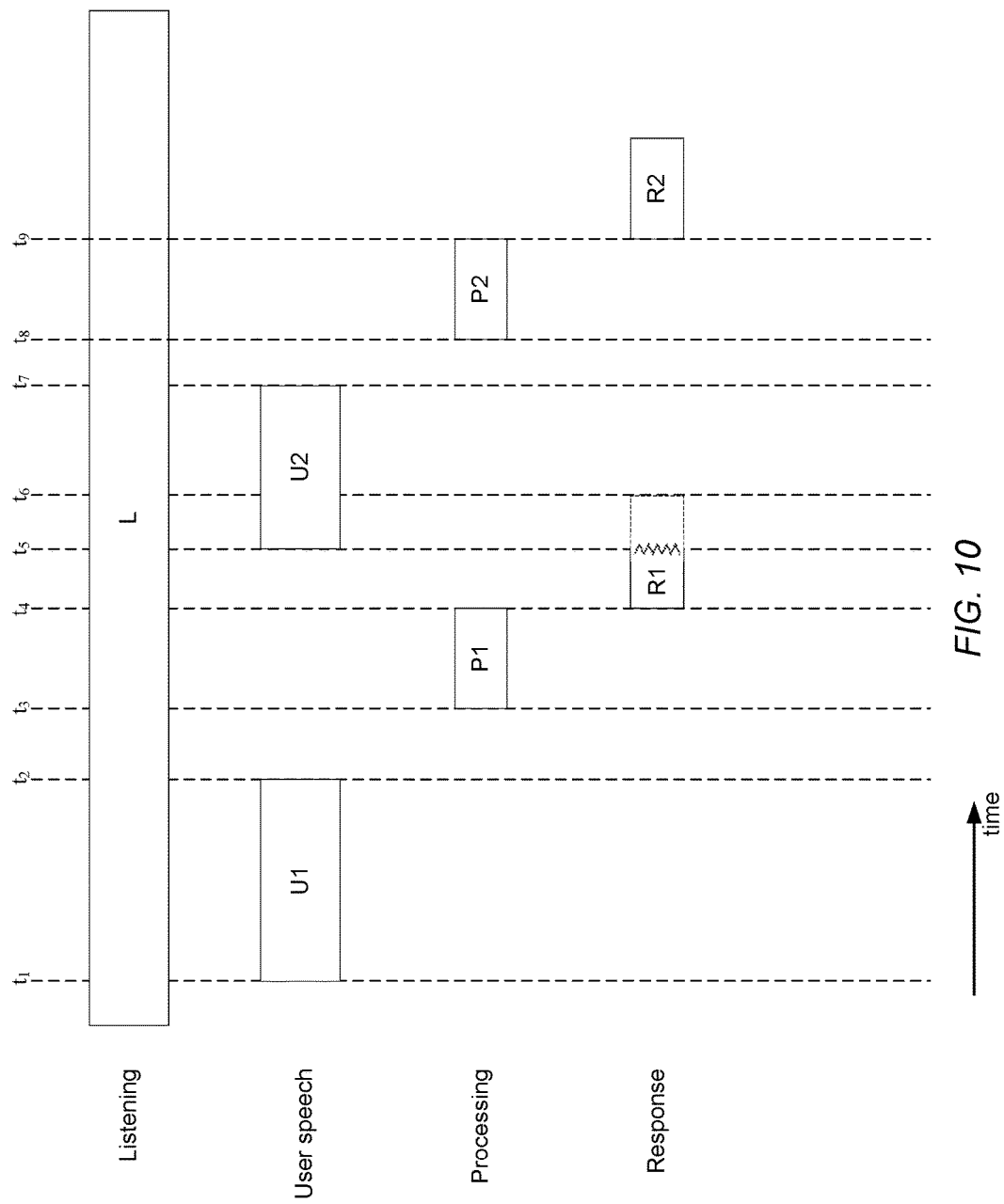

FIG. 10 illustrates the interruption of a response, according to one embodiment. The parser 222 handles utterance $U_1$ creating query Q1, processed in stage $P_1$, producing response $R_1$ by time $t_4$. The output manager 230 begins to output the response $R_1$ at time $t_4$. At a later time $t_5$, the input module 210 detects a second utterance $U_2$ and $U_1+U_2$ is parsed as query $Q_2$. In an embodiment, the logic relationship of $Q_1$ and $Q_2$ is analyzed by query serializer 243 before it causes the output manager 230 to halt the outputting of response $R_1$ at time $t_5$, instead processing $U_1+U_2$ starting at time $t_8$ and outputting result $R_2$ at time $t_9$. Accordingly, the output manager 230 halts the outputting of $R_1$. For example, if $U_1$ were the phrase "what is the weather tomorrow", the output module begins to output a description of tomorrow's forecasted weather for the user's current location, but if $U_2$ were the phrase "in Rome", the weather tomorrow at the user's current location would be irrelevant (assuming that the user is not in or near Rome), and so the output manager 230 would cease outputting the description of the local weather.

Example Computer Architecture

Figure 11:
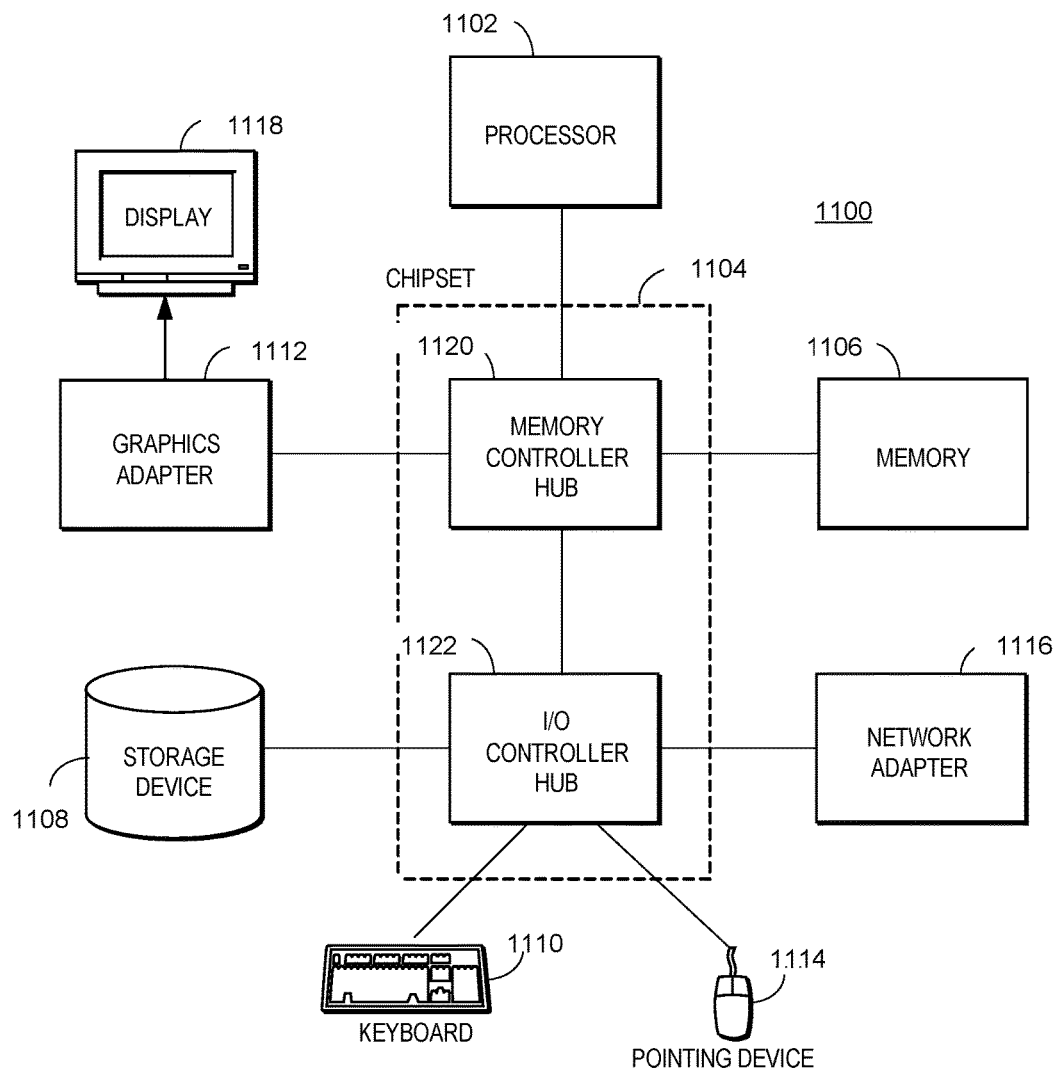
FIG. 11 is a high-level block diagram illustrating physical components of a computer used as part or all of the query-processing server or client device of FIG. 1, according to one embodiment.

FIG. 11 is a high-level block diagram illustrating physical components of a computer 1100 used as part or all of the query-processing server 100 or client device 110 from FIG. 1, according to one embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is any non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer 1100. The graphics adapter 1112 displays images and other information on the display 1118. The network adapter 1116 couples the computer 1100 to a local or wide area network.

As is known in the art, a computer 1100 can have different and/or other components than those shown in FIG. 11. In addition, the computer 1100 can lack certain illustrated components. In one embodiment, a computer 1100 acting as a server may lack a keyboard 1110, pointing device 1114, graphics adapter 1112, and/or display 1118. Moreover, the storage device 1108 can be local and/or remote from the computer 1100 (such as embodied within a storage area network (SAN)).

As is known in the art, the computer 1100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1108, loaded into the memory 1106, and executed by the processor 1102.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment. The indefinite article "a" and "an" should be understood to include both the singular and the plural as appropriate for the context; thus "a block" should be understood for example to mean "at least one block".

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

What is claimed is:

1. A computer-implemented method of generating a response to a spoken input, the method comprising:
   obtaining an audio input stream;
   detecting in the audio input stream a beginning of a first utterance;
   detecting in the audio input stream an end of the first utterance;
   responsive to detecting the end of the first utterance, initiating processing of the first utterance to recognize a first query;
   while processing the first utterance:
      continuing to receive the audio input stream; and
      detecting a beginning of a second utterance in the audio input stream,
   executing the first query to determine a first response;
   detecting an end of the second utterance in the audio input stream;
   processing the second utterance to recognize a second query;
   identifying a serial dependency between the first query and the second query;
   responsive to the identification of the serial dependency, delaying execution of the second query until the executing of the first query has completed;
   executing the second query to determine a second response; and
   outputting the second response;
   wherein detecting ends of utterances comprises identifying at least one of: a pause in speech in the audio input stream, non-speech in the audio input stream, or a user input event performed by a user.

2. The computer-implemented method of claim 1, wherein processing the second utterance is performed concurrently with executing the first query.

3. The computer-implemented method of claim 1, wherein outputting the first response is performed concurrently with executing the second query.

4. The computer-implemented method of claim 1, wherein the first response is output visually, the method further comprising:
   determining whether a display period has elapsed since the first response was output visually; and
   clearing the visual output of the response after the elapse of the display period.

5. A non-transitory computer-readable storage medium storing instructions for generating a response to a spoken input, the instructions when executed by a computer processor performing actions comprising:
   obtaining an audio input stream;
   detecting in the audio input stream a beginning of a first utterance;
   detecting in the audio input stream an end of the first utterance;
   responsive to detecting the end of the first utterance, initiating processing of the first utterance to recognize a first query;
   while processing the first utterance:
      continuing to receive the audio input stream; and
      detecting a beginning of a second utterance in the audio input stream,
   executing the first query to determine a first response;
   detecting an end of the second utterance in the audio input stream;
   processing the second utterance to recognize a second query;
   identifying a serial dependency between the first query and the second query;
   responsive to the identification of the serial dependency, delaying execution of the second query until the executing of the first query has completed;
   executing the second query to determine a second response; and
   outputting the second response;
   wherein detecting ends of utterances comprises identifying at least one of: a pause in speech in the audio input stream, or non-speech in the audio input stream.

6. The non-transitory computer-readable storage medium of claim 5, wherein processing the second utterance is performed concurrently with executing the first query.

7. The non-transitory computer-readable storage medium of claim 5, wherein outputting the first response is performed concurrently with executing the second query.

8. The non-transitory computer-readable storage medium of claim 5, wherein the first response is output visually, the actions further comprising:
   determining whether a display period has elapsed since the first response was output visually; and
   clearing the visual output of the response after the elapse of the display period.

* * * * *